(12) United States Patent
Okamura (10) Patent No.: US 11,386,705 B2
(45) Date of Patent: Jul. 12, 2022

(54) FEATURE AMOUNT MANAGEMENT APPARATUS AND METHOD (71) Applicant: TOSHIBA TEC KABUSHIKI KAISHA, Tokyo (JP)

(72) Inventor: Atsushi Okamura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 16/910,122

(22) Filed: Jun. 24, 2020

(65) Prior Publication Data

US 2021/0089756 A1 Mar. 25, 2021

(30) Foreign Application Priority Data

Sep. 20, 2019 (JP) .............................. JP2019-171589

(51) Int. Cl.
*G06K 9/00* (2022.01)
*G06V 40/16* (2022.01)
*G07C 9/20* (2020.01)
*G07C 9/37* (2020.01)

(52) U.S. Cl.
CPC .......... *G06V 40/172* (2022.01); *G06V 40/164* (2022.01); *G06V 40/166* (2022.01); *G06V 40/171* (2022.01); *G06V 40/176* (2022.01); *G07C 9/215* (2020.01); *G07C 9/37* (2020.01)

(58) Field of Classification Search
CPC .......... G06K 9/00288; G06K 9/00241; G06K 9/00255; G06K 9/00281; G06K 9/00315; G06K 9/00268; G06K 9/00771; G06K 9/00885; G06K 9/00926; G06K 2009/00953; G07C 9/215; G07C 9/37; G07C 9/27; G07C 9/38; G07C 2209/02; G07C 2209/08; G07C 2209/41; G06F 16/5866
See application file for complete search history.

(56) References Cited

U.S. PATENT DOCUMENTS

| 2010/0250963 | A1* | 9/2010 | Furuichi | ................. | G06F 21/10 |
| | | | | | 713/189 |
| 2013/0170717 | A1* | 7/2013 | Yabuki | ............... | G06K 9/00885 |
| | | | | | 382/115 |

FOREIGN PATENT DOCUMENTS

| JP | 2007066288 A | * | 3/2007 | ............. G06F 21/24 |
| JP | 2013-101226 | | 5/2013 | |

* cited by examiner

*Primary Examiner* — Dhaval V Patel (74) *Attorney, Agent, or Firm* — Amin, Turocy & Watson, LLP (57) ABSTRACT

According to one embodiment, a feature amount management apparatus includes a data generation unit, an ID generation unit, a storage unit, and a deletion unit. The data generation unit generates, from an image, feature amount data indicating a feature amount of biometric information of a person. The ID generation unit generates identification information including expiration date information used for determining an expiration date of the feature amount data. The storage unit stores the feature amount data in correlation with the identification information. The deletion unit deletes the feature amount data when the feature amount data pass the expiration date.

17 Claims, 7 Drawing Sheets

FEATURE AMOUNT MANAGEMENT APPARATUS AND METHOD

CROSS-REFERENCE TO RELATED APPLICATION

This application is based upon and claims the benefit of priority from Japanese Patent Application No. 2019-171589, filed in Sep. 20, 2019, the entire contents of which are incorporated herein by reference.

FIELD

Embodiments described herein relate generally to a feature amount management apparatus and a method.

BACKGROUND

There is a case in which a store operator wishes to identify that the same person visits a store a plurality of times by using a camera installed in the store, and to perform repeat analysis for analyzing a store visit history and a purchase history. In this case, for example, a system for the repeat analysis generates feature amount data indicating a feature of biometric information of a person in an image based upon the image photographed by using the camera. The system identifies whether a person is the same person by comparing the feature amount data of the person who visited the store in the past by using the generated feature amount data. However, storing the feature amount data for a long period of time is considered to be undesirable from a viewpoint of privacy.

DETAILED DESCRIPTION

A problem to be solved by embodiments is to provide a feature amount management apparatus and a method capable of managing feature amount data in consideration of privacy.

In general, according to one embodiment, a feature amount management apparatus includes a data generation unit, an ID generation unit, a storage unit, and a deletion unit. The data generation unit generates, from an image, feature amount data indicating a feature amount of biometric information of a person. The ID generation unit generates identification information including expiration date information used for determining an expiration date of the feature amount data. The storage unit stores the feature amount data in correlation with the identification information. The deletion unit deletes the feature amount data when the feature amount data pass the expiration date.

Hereinafter, an analysis system according to several embodiments will be described with reference to the drawings. Each drawing used for the description of the following embodiments may be illustrated by omitting a configuration for the sake of description. In each drawing and the following description, the same reference sign indicates the same element.

First Embodiment

Figure 1:
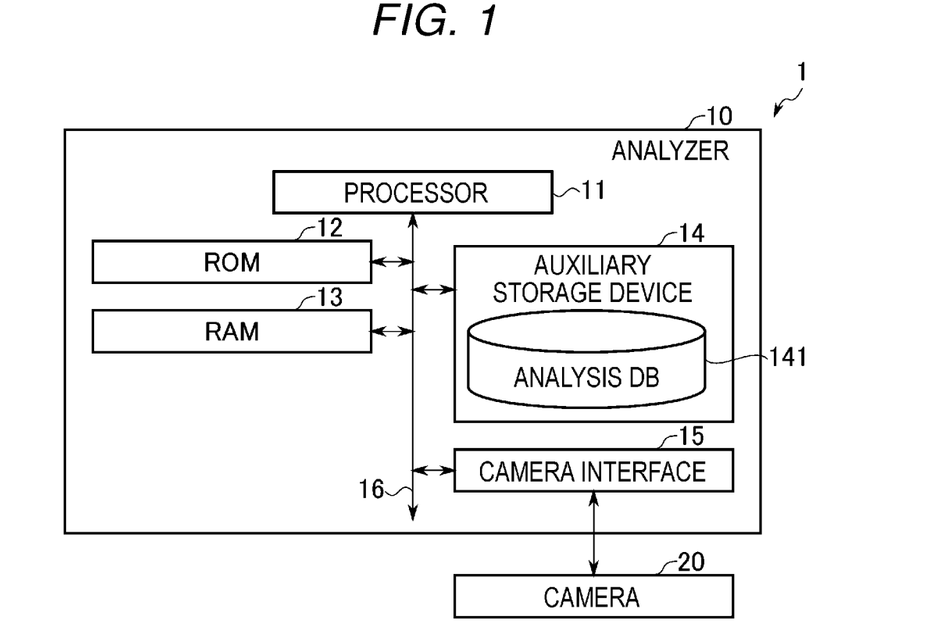
FIG. 1 is a block diagram illustrating an example of a main circuit configuration of an analysis system according to first to third embodiments and an analyzer provided in the analysis system.

FIG. 1 is a block diagram illustrating an example of a main circuit configuration of an analysis system 1 according to a first embodiment and an analyzer provided in the analysis system 1. The analysis system 1 is a system for performing repeat analysis. The analysis system 1 includes, for example, an analyzer 10 and a camera 20.

The analyzer 10 is an apparatus used for performing the repeat analysis. The analyzer 10 includes, for example, a processor 11, a read-only memory (ROM) 12, a random-access memory (RAM) 13, an auxiliary storage device 14, and a camera interface 15. A bus 16 connects the above-described respective units. The analyzer 10 is an example of a feature amount management apparatus.

The processor 11 corresponds to a central portion of a computer that performs processing such as calculation and control necessary for an operation of the analyzer 10. The processor 11 controls each unit to realize various functions of the analyzer 10 based upon programs such as firmware, system software, and application software stored in the ROM 12 or the auxiliary storage device 14. A part or all of the programs may be incorporated in a circuit of the processor 11. The processor 11 includes, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD) or a field-programmable gate array (FPGA). Alternatively, the processor 11 is a combination of a plurality thereof.

The ROM 12 corresponds to a main storage apparatus of the computer including the processor 11 as a center. The ROM 12 is a nonvolatile memory used exclusively for reading data. The ROM 12 stores, for example, the firmware among the above-described programs. The ROM 12 also stores data to be used when the processor 11 performs various processing.

The RAM 13 corresponds to a main storage apparatus of the computer including the processor 11 as a center. The RAM 13 is a memory used for reading and writing data. The RAM 13 is used as a work area for storing data to be temporarily used when the processor 11 performs various processing. The RAM 13 is typically a volatile memory.

The auxiliary storage device 14 corresponds to an auxiliary storage apparatus of the computer including the processor 11 as a center. The auxiliary storage device 14 is, for example, an electric erasable programmable read-only memory (EEPROM), a hard disk drive (HDD), or a flash memory. The auxiliary storage device 14 stores, for example, the system software and the application software among the above-described programs. The auxiliary storage device 14 stores data to be used when the processor 11 performs various processing, data generated by the processing performed by the processor 11, and various setting values.

Figure 2:
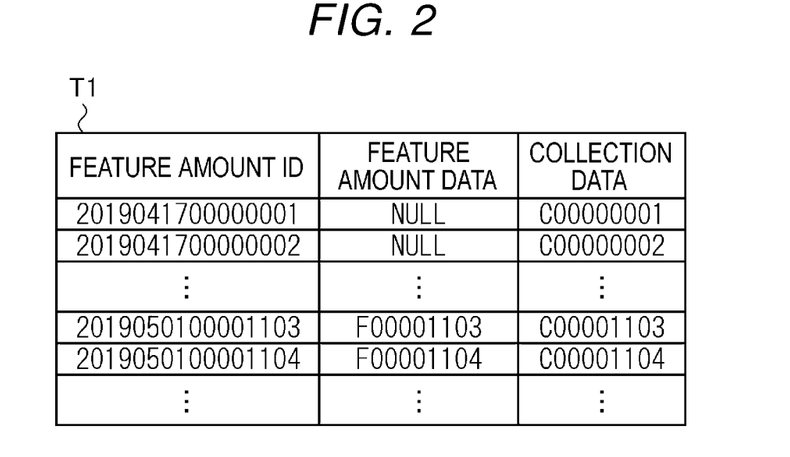
FIG. 2 is a diagram illustrating an example of a table according to the first embodiment and the second embodiment stored in an auxiliary storage device in FIG. 1.

The auxiliary storage device 14 stores an analysis DB 141. The analysis DB 141 stores and manages data related to the repeat analysis. The analysis DB 141 includes, for example, a table T1 as illustrated in FIG. 2. FIG. 2 is a diagram illustrating an example of the table T1 stored in the auxiliary storage device 14.

The table T1 correlates feature amount data and collection data with a feature amount ID (identifier).

The feature amount ID is unique identification information assigned to each feature amount data registered in the analysis DB 141. The feature amount ID includes expiration date information and a serial number.

The expiration date information is information for determining an expiration date of the feature amount data. The expiration date information is, for example, information indicating a start time or an end time of a validity period. The information indicating the start time of the validity period is, for example, a generation date or a generation date and time of the feature amount data or the feature amount ID. The information indicating the end time of the validity period is, for example, a date or a date and time indicating the expiration date. The end time of the validity period is the same as the expiration date.

The serial number is, for example, a number that increases every time the feature amount ID is generated. Therefore, the serial number is a unique number for each feature amount ID.

As an example, it is assumed that the generation date and time of the feature amount data or feature amount ID is 17:15:20 on May 1, 2019. The feature amount ID includes, for example, "20190501" as information indicating the start time of the validity period. The serial number is, for example, "00001103" on the assumption that the feature amount ID is generated 1103th. In this case, the feature amount ID becomes, for example, "2019050100001103" or "0000110320190501". The feature amount ID may include the expiration date information and the serial number, but here, the feature amount ID including only the expiration date information and the serial number is shown as an example.

The information indicating the start time of the validity period may include hours, minutes, and seconds. In this case, the feature amount ID includes, for example, "20190501171520" or "201905011715" as the information indicating the start time of the validity period.

As an example, it is assumed that the validity period of the feature amount data is six months from the generation. In this case, the expiration date is 17:15:20 on Nov. 1, 2019, which is six months after the generation date and time. Alternatively, the expiration date is, for example, Nov. 1, 2019 or Nov. 2, 2019, rounded up with a time shorter than a day as a fraction. In this case, the feature amount ID includes, for example, "20191101" or "20191101171520" as the information indicating the end time of the validity period.

The expiration date information may represent date and time by another expression form such as UNIX (registered trademark) time.

As described above, the feature amount ID is an example of identification information including the expiration date information used for determining the expiration date of the feature amount data. The information indicating the start time of the validity period or the information indicating the end time of the validity period is an example of the expiration date information used for determining the expiration date of the feature amount data.

The feature amount data are data indicating a feature of biometric information capable of identifying an individual. The biometric information is, for example, a physical feature such as a face or a behavioral feature such as a gait. The analyzer 10 deletes the feature amount data whose expiration date passes. A record in which the feature amount data are NULL in the table T1 indicates a fact that the feature amount data correlated with the feature amount ID of the record are deleted.

The collection data are various data relating to the individual to be identified by the feature amount data correlated with the feature amount ID, and are data used for the repeat analysis. The collection data are, for example, attributes such as gender, age, and race, moving line data, action history, store visit history, and purchase history of the individual.

The analysis DB 141 stores validity period information indicating the validity period. For example, when the validity period is six months, the validity period information is information indicating six months.

The analysis DB 141 stores a deleted number N_deleted. Among the feature amount IDs included in the table T1, the feature amount ID whose serial number to be included is equal to or less than the deleted number N_deleted indicates that the correlated feature amount data are deleted.

The program stored in the ROM 12 or the auxiliary storage device 14 includes a program for executing processing which will be described later. As an example, the analyzer 10 is transferred to a manager of the analyzer 10 in a state where the program is stored in the ROM 12 or the auxiliary storage device 14. However, the analyzer 10 may be transferred to the manager in a state where the program is not stored in the ROM 12 or the auxiliary storage device 14. The analyzer 10 may be transferred to the manager in a state where a program different from the aforementioned program is stored in the ROM 12 or the auxiliary storage device 14. Then, the program for executing the processing which will be described later may be separately transferred to the manager, and the transferred program may be written to the ROM 12 or the auxiliary storage device 14 under an operation of the manager or a service person. At this time, for example, the transfer of the program can be realized by recording the program on a removable storage medium such as a magnetic disk, a magneto-optical disk, an optical disk, or a semiconductor memory, or by downloading the program via a network.

The camera interface 15 is an interface for the analyzer 10 to communicate with the camera 20. The analyzer 10 receives image data outputted from the camera 20 by using the camera interface 15.

The bus 16 includes a control bus, an address bus, and a data bus, and transmits a signal to be transmitted and received to and from each unit of the analyzer 10.

The camera 20 is installed in a specific space such as a store or another facility. The camera 20 is installed, for example, to photograph a person who comes to the specific space. The specific space may be indoor or outdoor. A plurality of cameras 20 may be installed. The camera 20 photographs and outputs an image. The image may be a still image or a moving image.

Figure 3:
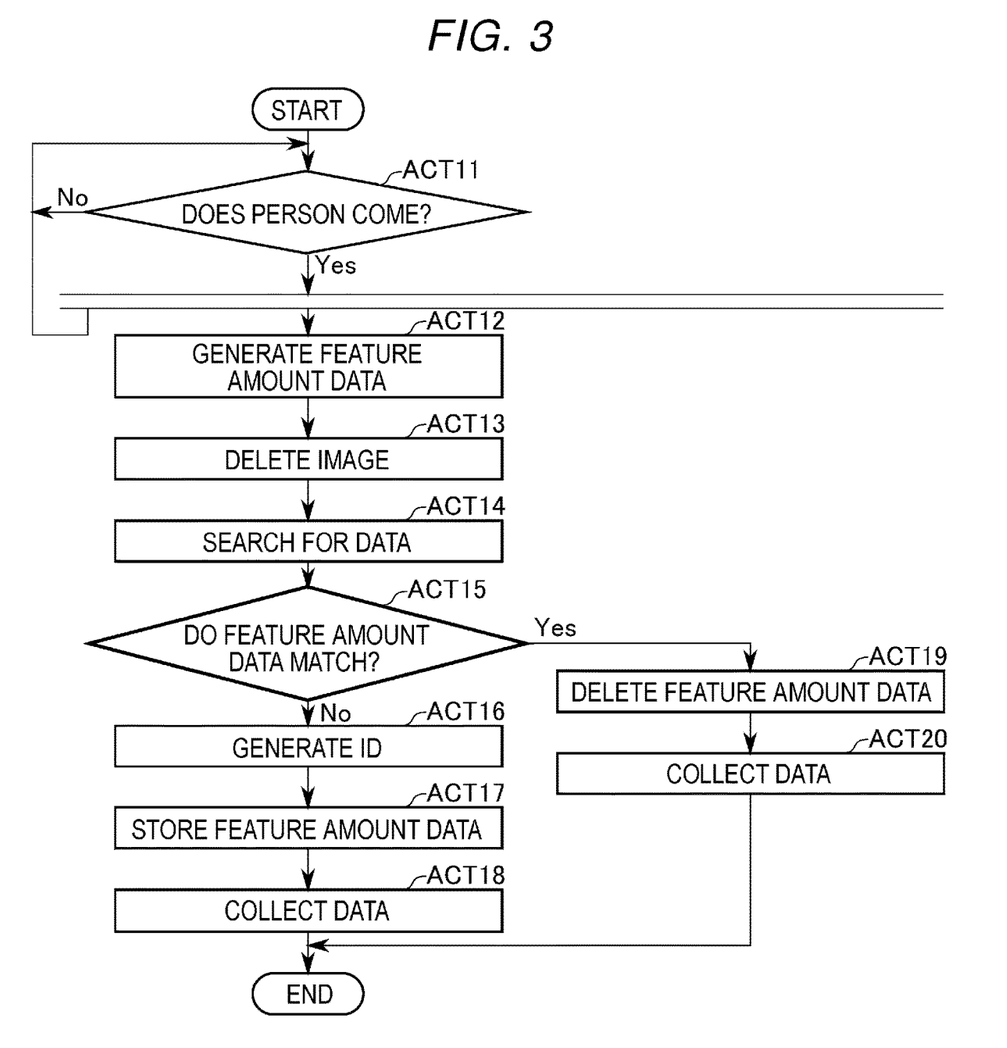
FIG. 3 is a flowchart illustrating an example of processing according to the first embodiment by a processor in FIG. 1.
Figure 4:
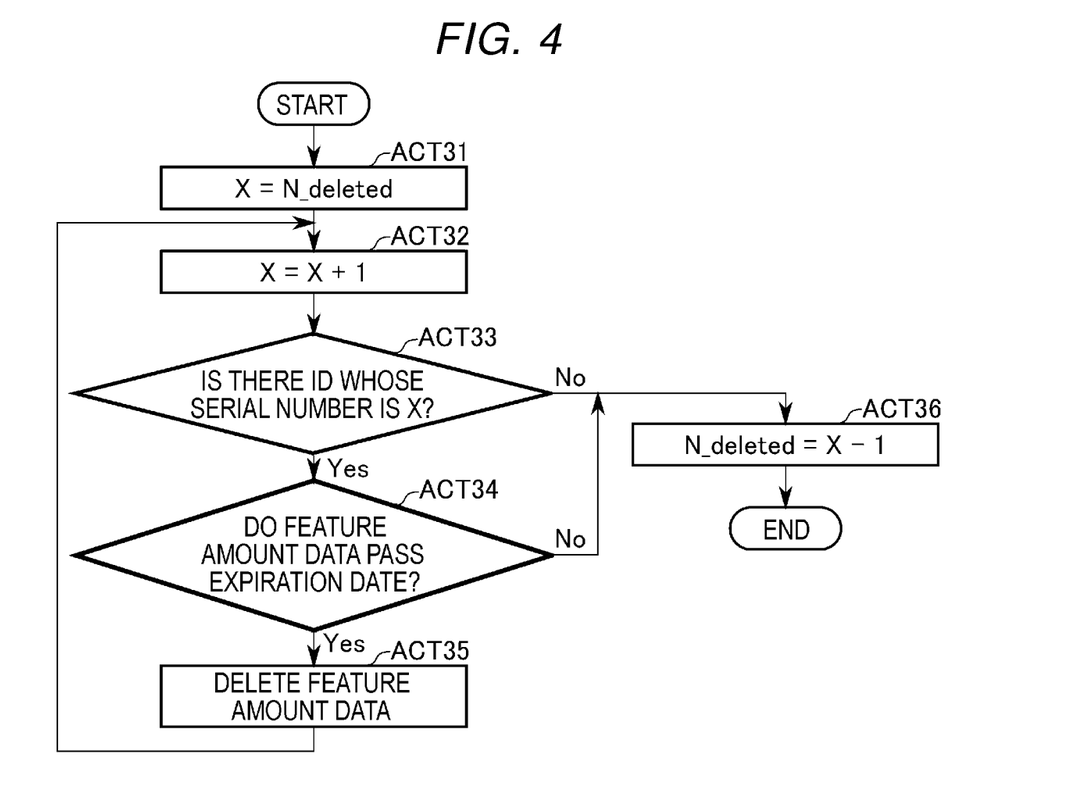
FIG. 4 is a flowchart illustrating an example of processing.

Hereinafter, an operation of the analysis system 1 according to the first embodiment will be described with reference to FIGS. 3 and 4. A content of the processing in the following operation description is merely one example, and various processing capable of obtaining the same result can be appropriately used. FIGS. 3 and 4 are flowcharts illustrating an example of processing performed by the processor 11 of the analyzer 10. The processor 11 executes this processing based upon, for example, the program stored in the ROM 12 or the auxiliary storage device 14. When the processor 11 proceeds to ACT (n+1) after the processing of ACT n (n is a natural number), the description thereof may be omitted.

First, processing related to the generation of feature amount data and the collection of data necessary for the repeat analysis will be described.

In ACT 11 of FIG. 3, the processor 11 of the analyzer 10 determines whether or not a person came to a specific space. For example, the processor 11 determines whether or not the person came by analyzing the image outputted from the camera 20. Alternatively, the processor 11 may determine that the person came to the specific space by using a sensor. Alternatively, the processor 11 determines that the person came to the specific space by another well-known method. When the processor 11 does not determine that the person came to the specific space, the processor 11 determines No in ACT 11 and repeats ACT 11. When determining that the person came to the specific space, the processor 11 determines Yes in ACT 11, and repeats ACT 11. However, when determining Yes in ACT 11, the processor 11 starts processing indicated in ACT 12 to ACT 20 in parallel or side by side with ACT 11 by another process or another thread. The processor 11 performs the processing of ACT 12 to ACT 20 started here for the person as a target who is determined as a person who came to the specific space in ACT 11. The person to be targeted for the processing of ACT 12 to ACT 20 is hereinafter referred to as a "target person". Thus, every time the processor 11 determines that a person came, the processor 11 performs the processing of ACT 12 to ACT 20 for the person as the target person.

In ACT 12, the processor 11 generates the feature amount data from the image in which the target person is photographed. For example, the processor 11 generates the feature amount data by digitizing biometric information such as a feature of a face of the target person. The processor 11 functions as a data generation unit that generates the feature amount data by performing the processing of ACT 12.

In ACT 13, the processor 11 deletes the image used for generating the feature amount data. The reason is that storing the image used for generating the feature amount data is not desirable from a viewpoint of privacy.

In ACT 14, the processor 11 refers to the analysis DB 141 to search for the feature amount data in which the feature amounts match each other. When the feature amounts match each other at a certain rate or more, the processor 11 regards the feature amount data as the feature amount data in which the feature amounts match each other, and determines that the feature amounts match each other. The feature amount ID correlated with the feature amount data found by the processing of ACT 14 is hereinafter referred to as a "discovery ID".

In ACT 15, the processor 11 determines whether or not the feature amount data in which feature amounts match each other are found in the processing of ACT 14. When the processor 11 does not find the feature amount data in which the feature amounts match each other, the processor 11 determines No in ACT 15 and proceeds to ACT 16.

In ACT 16, the processor 11 generates the feature amount ID based upon the generation date and time of the feature amount data or the feature amount ID as described above.

The processor 11 functions as an ID generation unit that generates the identification information including the expiration date information by performing the processing of ACT 16.

In ACT 17, the processor 11 stores the feature amount ID generated in ACT 16 and the feature amount data generated in ACT 12 in correlation with each other in the analysis DB 141. That is, the processor 11 adds a new record including the feature amount ID and the feature amount data to the table T1. As described above, the analysis DB 141 is an example of the storage unit that stores the feature amount data in correlation with the identification information. Alternatively, the auxiliary storage device 14 that stores the analysis DB 141 is an example of the storage unit.

In ACT 18, the processor 11 collects the data to be used for the repeat analysis such as attributes moving line data, behavior history, visit history, and purchase history of the target person to be processed. Next, the processor 11 records the collected data in the analysis DB 141 in correlation with the feature amount ID generated in ACT 16 as the collection data. For example, the processor 11 uses the camera 20 installed in the specific space, other cameras, a sensor, and data of a point of sale (POS) for collecting the data. Next, for example, the processor 11 ends the processing of ACT 18 in response to a fact that the target person goes out of the specific space.

When finding the feature amount data in which the feature amounts match each other, the processor 11 determines Yes in ACT 15 and proceeds to ACT 19.

In ACT 19, the processor 11 deletes the feature amount data generated in ACT 12.

In ACT 20, the processor 11 collects the data to be used for the repeat analysis in the same manner as that of ACT 18. However, the processor 11 records the collected data in the analysis DB 141 in correlation with the discovery ID as the collection data. At this time, for example, the processor 11 records new collection data in addition to the collection data already recorded in correlation with the discovery ID. Next, for example, the processor 11 ends the processing of ACT 20 in response to the fact that the target person goes out of the specific space.

The processor 11 ends a process or thread executing the processing in response to the completion of the processing of ACT 18 or ACT 20.

Next, processing related to the deletion of the feature amount data will be described.

For example, the processor 11 periodically starts the processing illustrated in FIG. 4. Alternatively, the processor 11 starts the processing illustrated in FIG. 4 when there is an input for instructing the execution of the processing illustrated in FIG. 4. When starting the processing illustrated in FIG. 4, the processor 11 assigns a variable X to the RAM 13.

In ACT 31 of FIG. 4, the processor 11 substitutes the deleted number N_deleted for the variable X.

In ACT 32, the processor 11 increases a value of the variable X by one.

In ACT 33, the processor 11 determines whether or not there is the feature amount ID whose serial number is the X-th in the table T1. As an example, if X is 108, the processor 11 determines whether or not the feature amount ID whose serial number is "00000108" exists in the table T1. When there is the feature amount ID whose serial number is the X-th in the table T1, the processor 11 determines Yes in ACT 33 and proceeds to ACT 34.

In ACT 34, the processor 11 determines whether or not the feature amount data correlated with the feature amount ID whose serial number is the X-th pass the expiration date. For example, when the feature amount ID includes information indicating a start time of the validity period, the processor 11 adds the validity period indicated by the validity period information to the start time. Next, when a result of the addition is earlier the current date and time, the processor 11 determines that the feature amount data pass the expiration date. When the feature amount ID includes information indicating an end time of the validity period and when the end time is earlier than the current date and time, the processor 11 determines that the feature amount data pass the expiration date. When determining that the feature amount data pass the expiration date, the processor 11 determines Yes in ACT 34 and proceeds to ACT 35.

In ACT 35, the processor 11 deletes the feature amount data correlated with the feature amount ID whose serial number is the X-th. Next, the processor 11 sets a value of a feature amount data field of the record specified by the feature amount ID in the table T1 to NULL. After the processing of ACT 35, the processor 11 returns to ACT 32.

In this manner, the processor 11 checks the expiration date in order from the feature amount data whose validity period ends earlier, and deletes the feature amount data whose expiration date passes.

As described above, the processor 11 performs the processing of ACT 35, thereby functioning as a deletion unit that deletes the feature amount data when the expiration date passes.

When there is no feature amount ID whose serial number is the X-th in the table T1, the processor 11 determines No in ACT 33 and proceeds to ACT 36. When determining that the feature amount data correlated with the feature amount ID whose serial number is the X-th do not pass the expiration date, the processor 11 determines No in ACT 34 and proceeds to ACT 36.

In ACT 36, the processor 11 sets a value of the deleted number N_deleted to (X−1). Accordingly, it is possible to know how many serial numbers of the feature amount ID are correlated with the feature amount data and how many feature amount data correlated therewith are deleted. After completing the processing of ACT 36, the processor 11 ends the processing illustrated in FIG. 4.

According to the analysis system 1 of the first embodiment, the processor 11 of the analyzer 10 determines whether or not the feature amount data pass the expiration date by using the expiration date information included in the feature amount ID which is correlated with the feature amount data. Next, the processor 11 deletes the feature amount data whose expiration date passes. As described above, since the analyzer 10 according to the first embodiment deletes the feature amount data in a certain period, it can be said that privacy is considered.

According to the analysis system 1 of the first embodiment, the processor 11 of the analyzer 10 determines whether or not the feature amount data pass the expiration date in order of the lower serial number included in the feature amount ID correlated with the feature amount data. Next, when there is the feature amount data whose expiration date does not pass, the processor 11 does not determine whether or not the expiration date passes with respect to feature amount data whose serial number is later than the feature amount data. The reason is that since the validity period ends earlier as the serial number is lower, all the feature amount data whose serial number is later than the feature amount data whose expiration date does not pass do not pass the expiration date. As described above, the analyzer 10 of the first embodiment can prevent unnecessary processing by allowing the feature amount ID to include the serial number.

According to the analysis system 1 of the first embodiment, the processor 11 of the analyzer 10 determines whether or not the feature amount data pass the expiration date in order from the serial number whose number is later than the deleted number N_deleted. In the case of the serial number whose number is equal to or less than the deleted number N_deleted, the feature amount data are already deleted. Therefore, the analyzer 10 of the first embodiment can prevent unnecessary processing by using the deleted number N_deleted.

Second Embodiment

When the same person comes to the specific space more than twice, the analysis system 1 of a second embodiment updates the expiration date by rewriting the feature amount ID every time the person comes to the specific space.

Since a configuration of the analysis system 1 of the second embodiment is the same as that of the first embodiment, the description thereof will be omitted.

Figure 5:
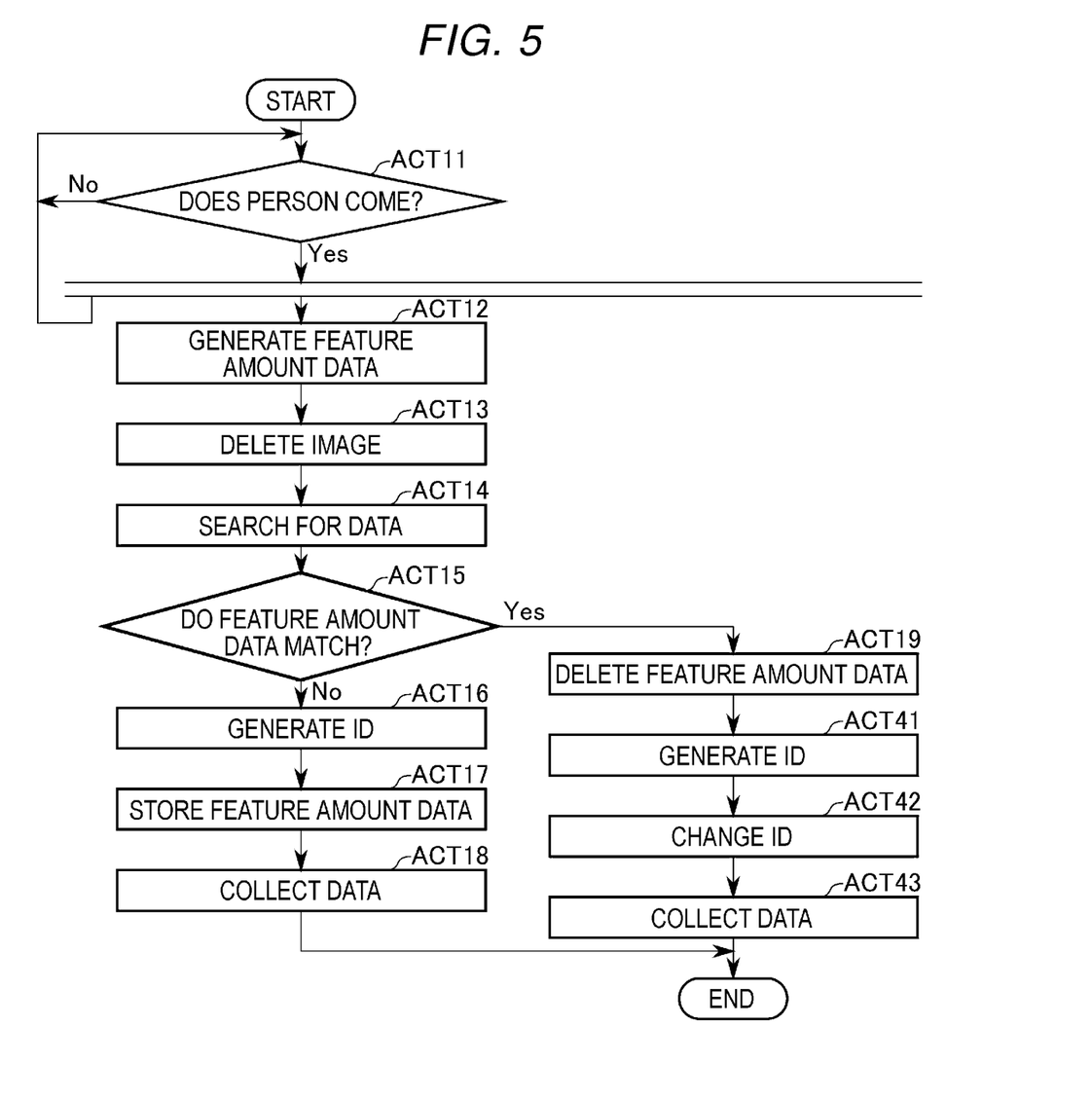
FIG. 5 is a flowchart illustrating an example of processing according to the second embodiment.
Figure 6:
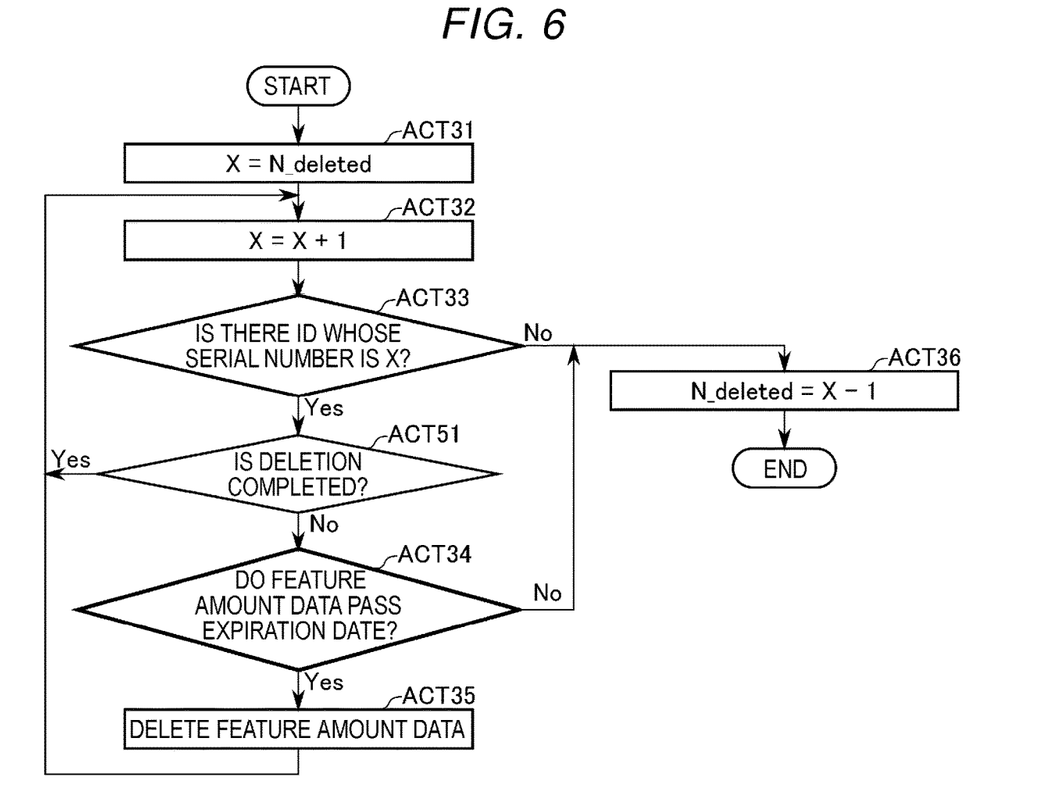
FIG. 6 is a flowchart illustrating an example of processing.

Hereinafter, an operation of the analysis system 1 according to the second embodiment will be described with reference to FIGS. 5 and 6. A content of the processing in the following operation description is merely one example, and various processing capable of obtaining the same result can be appropriately used. FIGS. 5 and 6 are flowcharts illustrating an example of processing performed by the processor 11 of the analyzer 10. The processor 11 executes this processing based upon, for example, the program stored in the ROM 12 or the auxiliary storage device 14. In the second embodiment, the processor 11 performs processing of FIG. 5 instead of the processing of FIG. 3 in the first embodiment. Next, in the second embodiment, the processor 11 performs processing of FIG. 6 instead of the processing of FIG. 4 in the first embodiment.

In the second embodiment, the processor 11 proceeds to ACT 41 after the processing of ACT 19.

In ACT 41, the processor 11 generates the feature amount ID in the same manner as that of ACT 16.

In ACT 42, the processor 11 rewrites the discovery ID to the feature amount ID generated in ACT 41. Therefore, the processor 11 functions as a change unit that changes the expiration date by performing the processing of ACT 42.

In ACT 43, the processor 11 collects the data to be used for the repeat analysis in the same manner as that of ACT 18. However, the processor 11 records the collected data in the analysis DB 141 in correlation with the feature amount ID rewritten in the processing of ACT 42 as the collection data. At this time, for example, the processor 11 records new collection data in addition to the collection data already recorded in correlation with the feature amount ID. Next, for example, the processor 11 ends the processing of ACT 43 in response to a fact that the target person goes out of the specific space.

The processor 11 ends a process or thread executing the processing in response to the completion of the processing of ACT 18 or ACT 43.

In the second embodiment, when determining Yes in ACT 33 of FIG. 6, the processor 11 proceeds to ACT 51.

In ACT 51, the processor 11 determines whether or not the feature amount data correlated with the feature amount ID whose serial number is the X-th are deleted. When the feature amount data are not deleted, the processor 11 determines No in ACT 51 and proceeds to ACT 34. On the other hand, when the feature amount data are deleted, the processor 11 determines Yes in ACT 51 and returns to ACT 32.

According to the analysis system 1 of the second embodiment, the processor 11 of the analyzer 10 rewrites the discovery ID to the newly generated feature amount ID. Accordingly, every time the person specified by the feature amount data correlated with the discovery ID comes to the specific space, the expiration date of the feature amount data is extended. Therefore, the analyzer 10 of the second embodiment can delete only the feature amount data of a person who does not come to the specific space for a certain period.

The analyzer 10 of the second embodiment can extend the expiration date of the feature amount data by performing a simple operation of rewriting the feature amount ID.

Third Embodiment

When the same person comes to the specific space more than twice, the analysis system 1 of a third embodiment updates the expiration date by correlating the newly generated feature amount ID with the feature amount ID generated when the person comes the first time every time the person comes to the specific space.

Figure 7:
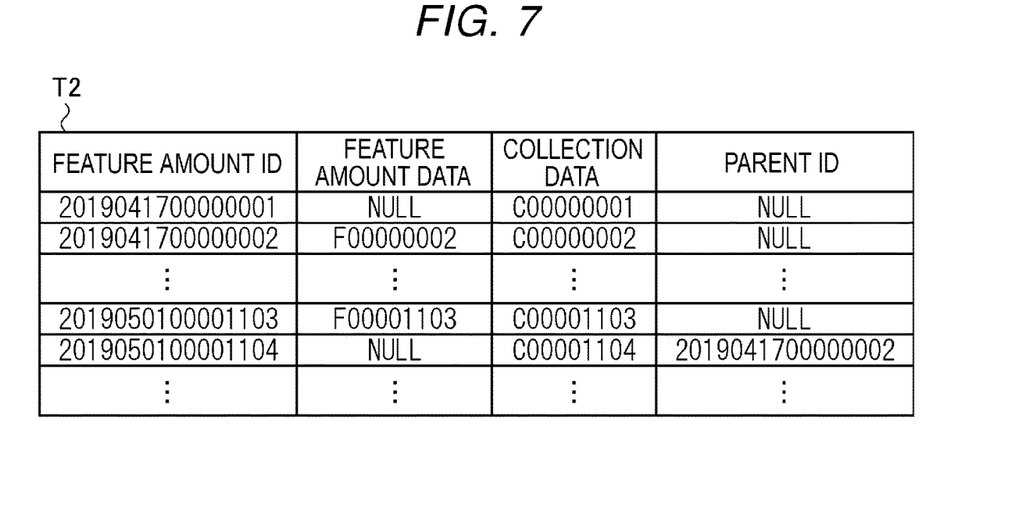
FIG. 7 is a diagram illustrating an example of a table according to the third embodiment.

Since a configuration of the analysis system 1 of the third embodiment is the same as that of the first embodiment, the description thereof will be omitted. However, in the third embodiment, the analysis DB 141 stored in the auxiliary storage device 14 includes a table T2 as illustrated in FIG. 7 instead of the table T1. FIG. 7 is a diagram illustrating an example of the table T2 stored in the auxiliary storage device 14.

The table T2 includes a parent ID in addition to the table T1. That is, the table T2 correlates the feature amount data, the collection data, and the parent ID with the feature amount ID.

A node whose parent ID is NULL indicates a root node. A node whose parent ID is not NULL indicates a child node whose parent node is the node specified by the parent ID. Each record of the table T2 indicates information on each node. The feature amount ID of the child node is referred to as a child ID.

In the table T2, the feature amount data of nodes other than the root node are NULL. In the table T2, with respect to the nodes other than the root node, even though the feature amount data thereof are NULL, it does not indicate that the correlated feature amount data are deleted.

The analysis DB 141 of the third embodiment includes an undeleted index. For example, the undeleted index includes: the feature amount ID of the child node having the same parent ID whose serial number is the latest and whose feature amount data of the parent node specified by the parent ID are not deleted; and the feature amount ID of the root node without the child node and whose feature amount data are not deleted. Accordingly, the undeleted index is a list of feature amount IDs indicating the feature amount data that are not deleted. In the undeleted index, the feature amount IDs are arranged in order of the number of the lower serial number.

Figure 8:
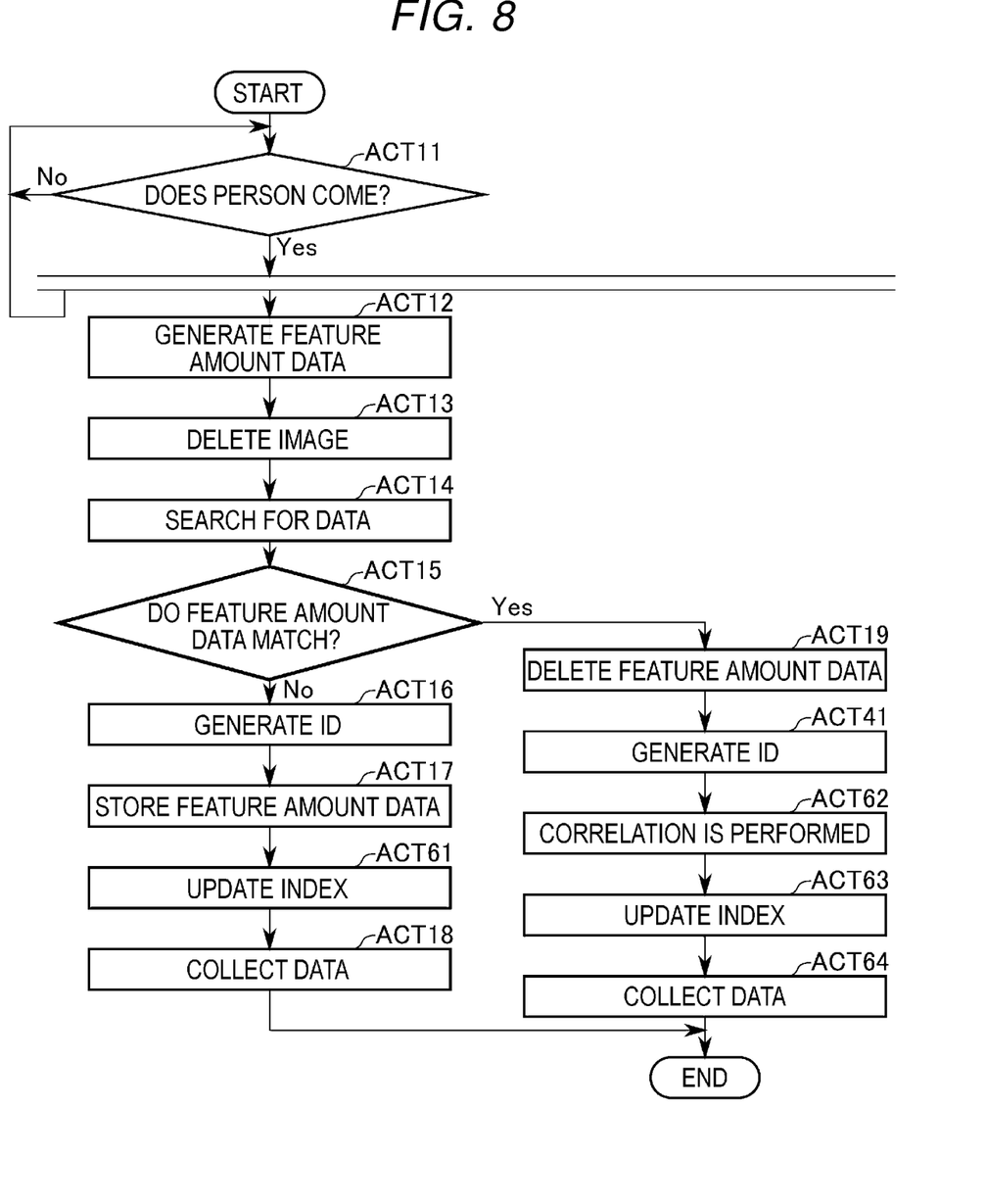
FIG. 8 is a flowchart illustrating an example of processing according to the third embodiment.
Figure 9:
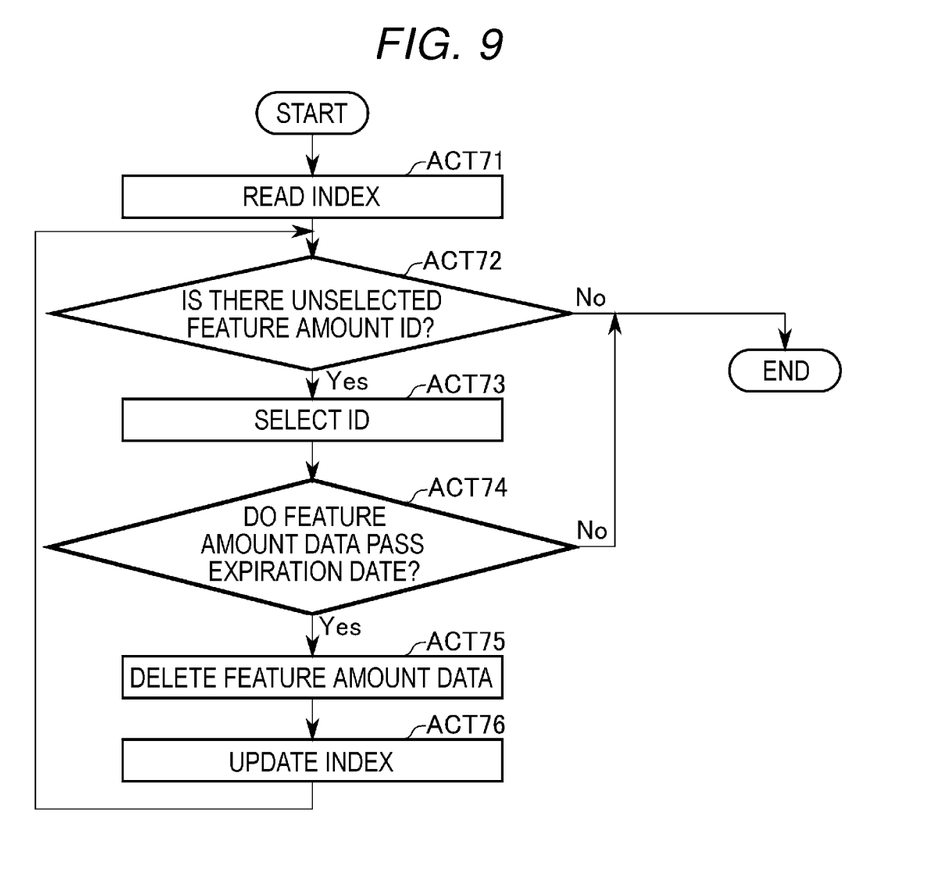
FIG. 9 is a flowchart illustrating an example of processing.

Hereinafter, an operation of the analysis system 1 according to the third embodiment will be described with reference to FIGS. 8 and 9. A content of the processing in the following operation description is merely one example, and various processing capable of obtaining the same result can be appropriately used. FIGS. 8 and 9 are flowcharts illustrating an example of processing performed by the processor 11 of the analyzer 10. The processor 11 executes this processing based upon, for example, the program stored in the ROM 12 or the auxiliary storage device 14. In the third embodiment, the processor 11 performs processing of FIG. 8 instead of the processing of FIG. 5 in the second embodiment. Then, in the third embodiment, the processor 11 performs processing of FIG. 9 instead of the processing of FIG. 6 in the second embodiment.

In the third embodiment, the processor 11 proceeds to ACT 61 after the processing of ACT 17 of FIG. 8.

In ACT 61, the processor 11 updates the undeleted index. That is, the processor 11 adds the feature amount ID generated in ACT 16 to the undeleted index. After the processing of ACT 61, the processor 11 proceeds to ACT 18.

In the third embodiment, the processor 11 proceeds to ACT 62 after the processing of ACT 41.

In ACT 62, the processor 11 correlates the feature amount ID generated in ACT 41 with the discovery ID. That is, the processor 11 adds a new record to the table T2. Next, the processor 11 sets a value of a feature amount ID field of the record to the feature amount ID generated in ACT 41. The processor 11 sets a value of a feature amount data field of the record to NULL. The processor 11 sets a value of a parent ID field of the record to the discovery ID. Accordingly, the newly added record indicates information on the child node of the node indicated by the feature amount ID correlated with the feature amount data found in ACT 14. The processor 11 functions as a change unit that changes the expiration date by performing the processing of ACT 62.

In ACT 63, the processor 11 updates the undeleted index. That is, the processor 11 deletes the feature amount ID whose parent ID is the discovery ID from the undeleted index. Next, the processor 11 adds the feature amount ID generated in ACT 41 to the undeleted index.

In ACT 64, the processor 11 collects the data to be used for the repeat analysis in the same manner as that of ACT 18. However, the processor 11 records the collected data in the analysis DB 141 in correlation with the feature amount ID generated in ACT 41 as the collection data. Next, for example, the processor 11 ends the processing of ACT 64 in response to a fact that the target person goes out of the specific space.

Therefore, in the third embodiment, when performing the repeat analysis using the collection data, the processor 11 uses not only the collection data of the root node but also the collection data of the child node of the root node.

The processor 11 ends a process or thread executing the processing in response to the completion of the processing of ACT 18 or ACT 64.

For example, the processor 11 periodically starts the processing illustrated in FIG. 9. Alternatively, the processor 11 starts the processing illustrated in FIG. 9 when there is an input for instructing the execution of the processing illustrated in FIG. 9.

In ACT 71 of FIG. 9, the processor 11 reads the undeleted index from the analysis DB 141.

In ACT 72, the processor 11 determines whether or not there is an unselected feature amount ID in the undeleted index. The selection of the feature amount ID will be described later. When there is the unselected feature amount ID in the undeleted index, the processor 11 determines Yes in ACT 72 and proceeds to ACT 73.

In ACT 73, the processor 11 selects the feature amount ID whose number of the serial number is the lowest among the unselected feature amount IDs in the undeleted index. When there is the feature amount ID under selection, the processor 11 cancels the selection and then selects the feature amount ID. Here, the feature amount ID that is not selected yet is the feature amount ID that is not selected even once in the processing of ACT 73 from the start of the processing of FIG. 9 to the end thereof.

In the same manner as that of ACT 34, in ACT 74, the processor 11 determines whether or not the expiration date of the feature amount data correlated with the feature amount ID under selection passes by using the feature amount ID under selection. When the feature amount ID under selection is that of the child node, the feature amount data correlated with the feature amount ID are the feature amount data of the parent node specified by the parent ID.

When determining that the feature amount data pass the expiration date, the processor 11 determines Yes in ACT 74 and proceeds to ACT 75.

In ACT 75, the processor 11 deletes the feature amount data correlated with the feature amount ID under selection. Next, the processor 11 sets the value of the feature amount data field to NULL with respect to the record correlated with the deleted feature amount data.

In ACT 76, the processor 11 updates the undeleted index. That is, the processor 11 deletes the feature amount ID under selection from the undeleted index. After the processing of ACT 76, the processor 11 returns to ACT 72.

On the other hand, when there is no unselected feature amount ID in the undeleted index, the processor 11 determines No in ACT 72 and ends the processing illustrated in FIG. 9. When determining that the feature amount data correlated with the feature amount ID under selection do not pass the expiration date, the processor 11 determines No in ACT 74 and ends the processing illustrated in FIG. 9.

According to the analysis system 1 of the third embodiment, the processor 11 of the analyzer 10 correlates the newly generated feature amount ID with the discovery ID. Accordingly, the analyzer 10 according to the third embodiment can obtain the same effect as that of the second embodiment.

Since the analyzer 10 of the third embodiment does not rewrite the feature amount ID, there is no possibility that the feature amount data or the collection data specified by the feature amount ID cannot be specified by rewriting.

The first to third embodiments can be modified as follows.

The serial number in the feature amount ID may be a value that decreases instead of the above-described value that increases every time the feature amount ID is generated. Such a serial number is a value that decreases by one every time the feature amount ID is generated from a number such as 99999999.

Apart or all of the feature amounts ID may be encrypted.

In the above-described embodiments, a system for performing the repeat analysis is described as an example. However, even in a system or an apparatus that uses the feature amount data for other uses, the feature amount data can be managed in the same manner as those of the above-described embodiments.

The analyzer 10 of the third embodiment may correlate the parent ID with the child ID by a method other than the above-described method.

In ACT 35, the processor 11 may delete not only the feature amount data correlated with the feature amount ID whose serial number is the X-th but also the feature amount ID. The processor 11 may delete each record specified by the feature amount ID.

The processor 11 may be formed in such a manner that a part or all of the processing realized by the program in the embodiment is realized by a hardware configuration of a circuit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A feature amount management apparatus, comprising:
a processor configured to:
generate, from an image, feature amount data indicating a feature amount of biometric information of a person;
generate identification information including expiration date information used for determining an expiration date of the feature amount data;
store the feature amount data in correlation with the identification information;
delete the feature amount data when the feature amount data passes the expiration date; and
change the expiration date when the feature amount data is determined to match the feature amount data stored in correlation with the identification information.

2. The feature amount management apparatus according to claim 1, wherein
the processor generates the identification information further including a serial number unique for each of the identification information.

3. The feature amount management apparatus according to claim 1, wherein
the processor changes the expiration date by changing the identification information stored in correlation with the identification information.

4. The feature amount management apparatus according to claim 1, wherein
the processor changes the expiration date by correlating the identification information stored in correlation with the identification information with newly generated identification information, and
deletes the feature amount data when the feature amount data passes the expiration date that is indicated by the expiration date information included in the newly generated identification information.

5. The feature amount management apparatus according to claim 1, wherein
the biometric information comprises at least one of a facial feature and a behavioral feature.

6. The feature amount management apparatus according to claim 1, wherein
the identification information comprises at least one of a start time and an end time of a validity period.

7. A method of causing a processor provided in a feature amount management apparatus to perform:
generating, from an image, feature amount data indicating a feature amount of biometric information of a person;
generating identification information including expiration date information used for determining an expiration date of the feature amount data;
storing the feature amount data in a storage component in correlation with the identification information;
deleting the feature amount data when the feature amount data passes the expiration date; and changing the expiration date when the feature amount data generated is determined to match the feature amount data stored.

8. The method according to claim 7, further comprising:
generating the identification information further including a serial number unique for each of the identification information.

9. The method according to claim 7, further comprising:
changing the expiration date by changing the identification information stored.

10. The method according to claim 7, further comprising:
changing the expiration date by correlating the identification information stored with newly generated identification information, and
deleting the feature amount data when the feature amount data passes the expiration date that is indicated by the expiration date information included in the newly generated identification information newly generated.

11. The method according to claim 7, wherein
the biometric information comprises at least one of a facial feature and a behavioral feature.

12. The method according to claim 7, wherein
the identification information comprises at least one of a start time and an end time of a validity period.

13. A non-transitory machine-readable storage medium, comprising executable instructions that, when executed by a processor, facilitate performance of operations, comprising:
generating, by the processor from an image, feature amount data indicating a feature amount of biometric information of a person;
generating identification information including expiration date information used for determining an expiration date of the feature amount data;
storing the feature amount data in a storage component in correlation with the identification information;
deleting the feature amount data when the feature amount data pass the expiration date; and
changing the expiration date when the feature amount data generated is determined to match the feature amount data stored.

14. The non-transitory machine-readable storage medium according to claim 13, further comprising performance of operations:
generating the identification information further including a serial number unique for each of the identification information.

15. The non-transitory machine-readable storage medium according to claim 13, further comprising performance of operations:
changing the expiration date by changing the identification information stored.

16. The non-transitory machine-readable storage medium according to claim 13, further comprising performance of operations:
changing the expiration date by correlating the identification information stored with newly generated identification information, and
deleting the feature amount data when the feature amount data pass the expiration date that is indicated by the expiration date information included in the newly generated identification information.

17. The non-transitory machine-readable storage medium according to claim 13, wherein
the biometric information comprises at least one of a facial feature and a behavioral feature, and
the identification information comprises at least one of a start time and an end time of a validity period.

* * * * *